Feb. 6, 1934.  P. P-G. HALL  1,945,854
MILLING CUTTER
Filed Feb. 17, 1930  3 Sheets-Sheet 1
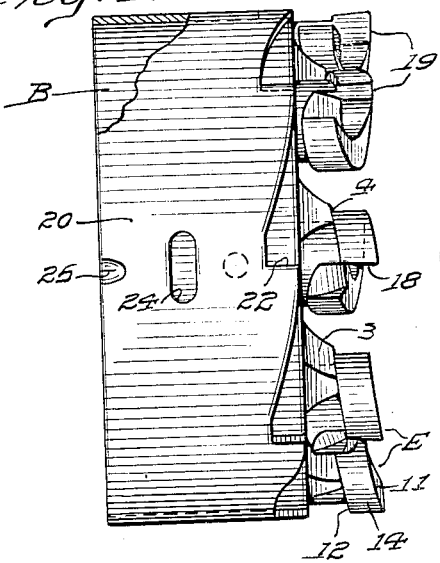
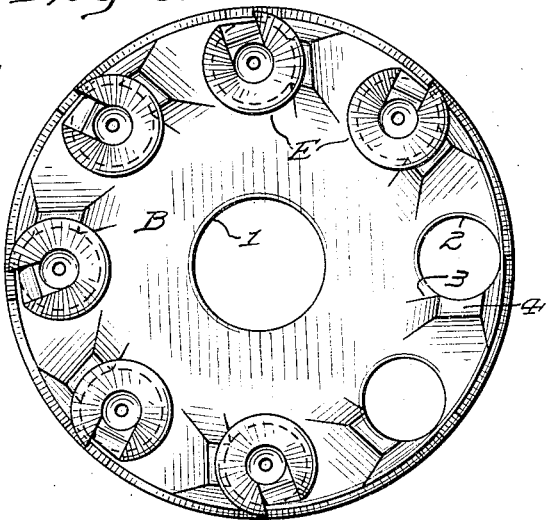
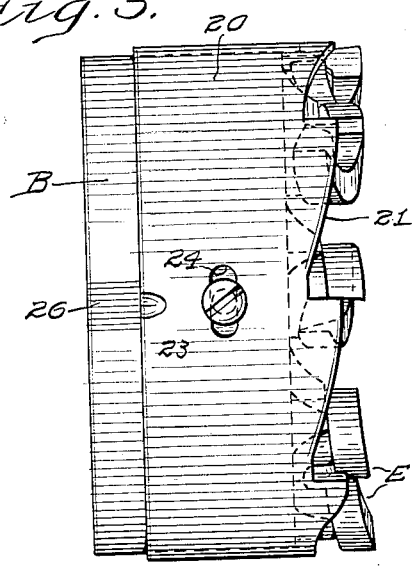
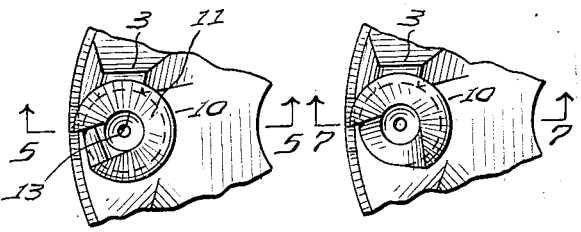
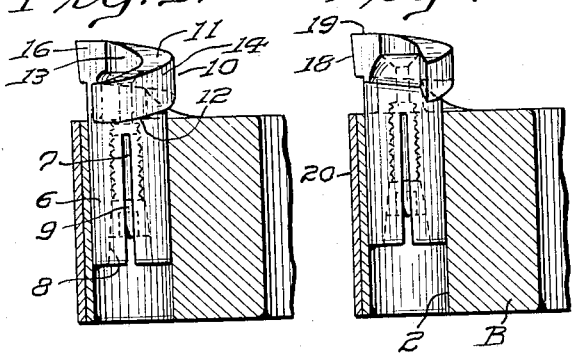
INVENTOR
Peter P-G. Hall.
BY
ATTORNEYS
WITNESS Feb. 6, 1934.  P. P-G. HALL  1,945,854
MILLING CUTTER
Filed Feb. 17, 1930  3 Sheets-Sheet 2
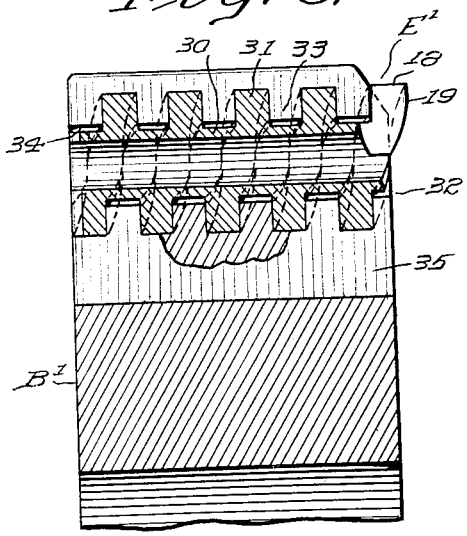
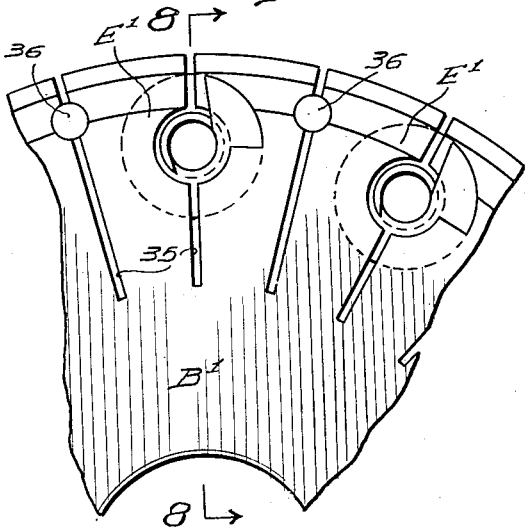
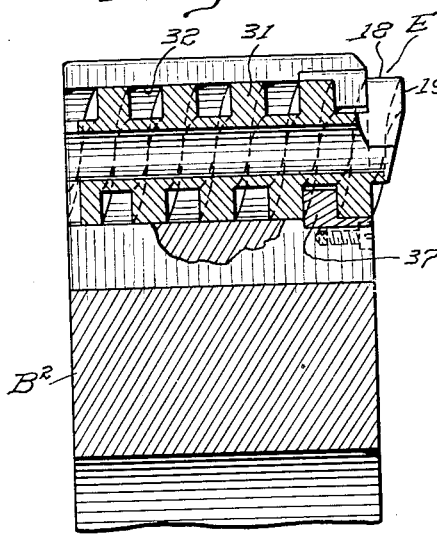
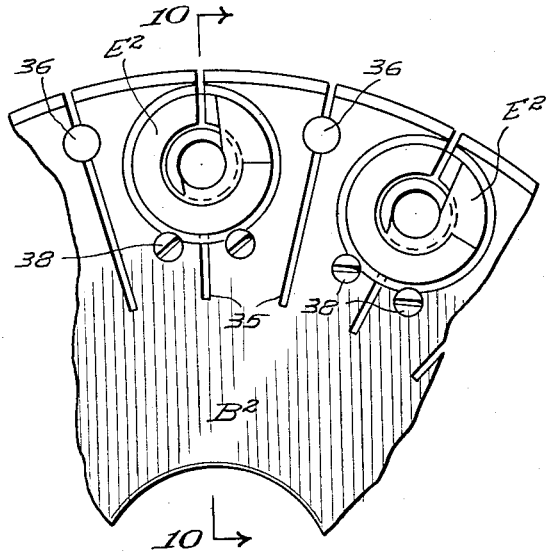
INVENTOR
Peter P-G. Hall.
WITNESS Feb. 6, 1934.  P. P-G. HALL  1,945,854
MILLING CUTTER
Filed Feb. 17, 1930  3 Sheets-Sheet 3
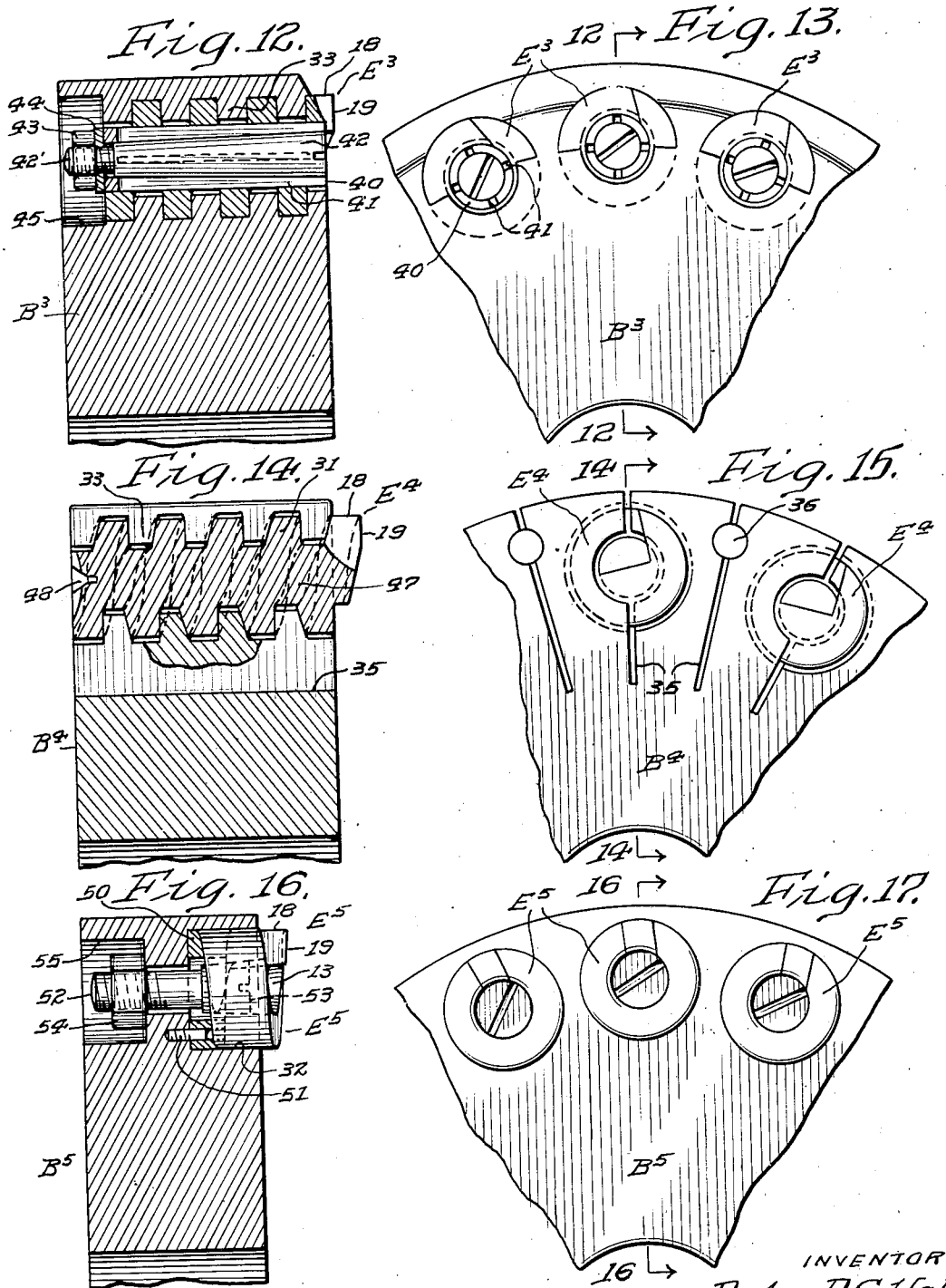

Patented Feb. 6, 1934

1,945,854

UNITED STATES PATENT OFFICE 1,945,854

MILLING CUTTER

Peter P-G. Hall, Philadelphia, Pa.

Application February 17, 1930. Serial No. 428,941

5 Claims. (Cl. 29—105)

My invention relates more particularly to milling cutters of the class which comprise a head and a plurality of cutting elements removably supported therein in annularly spaced relation, a cutter typical of this general type being disclosed in Figs. 1 and 2 of U. S. Letters Patent 1,717,380 granted to me June 18, 1929; such cutters are adapted for use in forming curved surfaces, both exterior and interior, and as surfacing cutters for the production of plane surfaces.

Each of the cutting elements utilized in such cutters may be so formed as to present one cutting edge extending substantially normal to the axis of the element and which thus lies in a plane generally normal to said axis and another cutting edge extending substantially parallel to said axis; the former of these cutting edges is usually employed for surfacing operations and the latter for boring operations, forming of curved surfaces and the like. For convenience I shall therefore refer herein to the first mentioned cutting edges of the several elements as the "end cutting edges" thereof, since they are disposed toward the front end of the cutter considered as a whole, and to the last mentioned cutting edges of the elements as the "side cutting edges" thereof.

While cutters of the general character of those shown in Figs. 1 and 2 of my said patent are eminently satisfactory for their intended purpose and have gone into extensive use since my invention thereof, it is necessary when using them to re-adjust the machine slightly each time that the cutter is re-ground in order to maintain a constant relation between the end cutting edges of the cutter elements and the work or, in other words, each time the cutter is resharpened, readjustment of the machine is required to obtain with the end cutting edges the same depth of cut in the work as that which was being formerly taken.

The necessity for this readjustment arises from the fact that each cutting element comprises a cylindrical head terminating at its rear or inner end in a flat face lying normal to the axis of the element and which rests against and is supported by the front and adjacent face of the cutter head or base when the element is assembled therein and with a substantially helicoidal surface at its opposite or front end; this surface thus forms a spiral which gradually recedes toward the opposite or rear end of the element so that as the spiral proceeds the distance between the front and rear faces of the element measured parallel to its axis becomes progressively less. Initially, as more fully explained in my said Patent 1,717,380, the cutting edges of the element are formed by providing an inwardly radially extending slot in its head, desirably symmetrically disposed with respect to the plane in which the leading and rear ends of the helicoidal surface meet; one side of this slot therefore forms a surface which, by intersection with the said helicoidal end surface of the cutter at or near its leading end, that is, the end most remote from the rear face of the element, forms the end cutting edge of the latter, and by corresponding intersection with the periphery of the element forms the side cutting edge. As the element is resharpened from time to time this surface is gradually ground back, the angle between it and a radial plane passing through the side cutting edge being customarily maintained as constant, with the result that the distance between the end cutting edge and the rear end of the element is progressively decreased as well as the length of the side cutting edge. Thus, each time that the element is ground, the end cutting edge is disposed a little nearer the rear face of the element, and as this face when the element is assembled in the base rests against the adjacent face of the latter, it is necessary in order to compensate for the consequent displacement of the end cutting edge toward the cutter base to move the cutter as a whole forwardly in the milling or other machine to a corresponding extent after each resharpening of the cutter. Additionally, under certain conditions, the progressive shortening of the side cutting edges of the several elements above referred to may gradually render the cutter less and less suitable for the performance of certain functions, while, in order to insure that the end cutting edges of all of the cutting elements will lie at the same distance from the base and thus in the same plane after each grinding, each element must be ground back to exactly the same extent, since the position of the end cutting edge of each element with respect to the base bears a direct relation to the amount or extent to which such element has been ground back.

Among the purposes and objects of the present invention, therefore, is to provide a milling cutter of the general type to which I have referred but so constructed and arranged that the end cutting edges of the several elements, irrespective of the amount of metal which may be removed from each element when it is re-ground, may be operatively maintained in an end cutting plane which is always the same axial distance from the base of the cutter, whereby the necessity of readjusting the milling or other machine in which the cutter is disposed each time that the cutter is resharpened is entirely obviated.

A further object of my invention is to provide a cutter of the character aforesaid in which the several cutting elements may each be ground independently to the exact extent required to effect the desired sharpness of the cutting edges, and embodying means whereby the several elements may be so adjusted that their end cutting edges all lie in the same plane regardless of any inequality in the amounts of metal which may have been removed from each element by the grinding operation.

A still further object of the invention is to provide cutting elements of novel form for milling or other cutters and of such character that the side cutting edges thereof remain of substantially the same length throughout the life of the element irrespective of the number of times which it may be resharpened and which, while requiring but a minimum amount of metal for their construction with corresponding minimization of the cost of their manufacture, afford a maximum length of operating life.

Additional objects, advantages and novel features of design, construction and arrangement comprehended by my invention are hereinafter set forth or will be apparent to those skilled in the art as the present description thereof proceeds.

While my invention readily lends itself to the varied requirements of modern machine shop practice and may thus partake of numerous forms in consequence of which I may employ any suitable combination and arrangement of instrumentalities adapted to bring about the desired results and perform the requisite functions, I have illustrated in the accompanying drawings and will now proceed to describe certain embodiments of my invention which are adapted for a wide range of milling and like operations and from which the nature and manner of performing my invention will be readily apparent to those familiar with cutters of the general class to which it relates and their use in milling and analogous machining operations.

In the said drawings, Fig. 1 is a view in side elevation, partially broken away into section, of a milling cutter embodying the invention and in association with a setting gauge of a type which may be conveniently employed as an aid in setting the cutting elements to their proper positions in the head and Fig. 2 is a front elevation of the same with two of the cutting elements removed. Fig. 3 is a side elevation similar to Fig. 1 showing the setting gauge in operative position with relation to the cutter; Fig. 4 is a fragmentary view in front elevation showing a single cutting element in operative relation to the base; Fig. 5 is a fragmentary section on the line 5—5 of Fig. 4, the cutting element, however, being shown in elevation and Figs. 6 and 7 are views corresponding respectively to Figs. 4 and 5 but showing the cutting element as it appears after it has been resharpened a number of times.

In Figs. 8 to 17 inclusive, I have fragmentarily shown other cutters of various forms but all constructed in accordance with and embodying the principles of my invention; thus, Fig. 8 is a fragmentary radial section through one of said cutters and Fig. 9 a fragmentary front end view thereof, Figs. 10 and 11 are similar views of another of said cutters and, in like manner, Figs. 12 and 13, 14 and 15, and 16 and 17, respectively, illustrate still others, in some instances but two of the cutting elements being shown as assembled in the head and in others three of said elements, notably in Figs. 13 and 17. So far as possible the same characters of reference are used to designate corresponding parts in the several figures of the drawings.

Referring first more particularly to that form of the invention shown in Figs. 1 to 7 inclusive, the cutter comprises a cylindrical head or base B having a central bore 1 adapted to receive an arbor (not shown) whereby the cutter may be operatively supported in the milling or other machine in the usual way.

The base is provided with a plurality of cutting elements E hereinafter more particularly described, which are removably supported in the base in annularly spaced relation near its periphery in any convenient way, and are preferably symmetrically disposed with respect to its central axis in suitably spaced cylindrical bores 2, in proximity to each of which is a boss 3 integral with the base and having a face 4 which provides axial support for the adjacent cutting element as will hereinafter more fully appear. The particular means for securing the cutting elements E in the base form no part of the present invention, and hence any means adapted for that purpose may be utilized if desired; in the particular embodiment shown and described, however, each element is provided with a cylindrical shank 6 having radial slots 7 parallel to its axis and a central bore 8 having a conical portion and a threaded portion and adapted to receive a threaded cone screw 9, the bore and the cone screw forming operative means whereby the segments of the shank may be expanded against the sides of the bore and thus frictionally hold the element rigidly in any desired position in the base.

In the particular cutter to which reference is now being made eight cutting elements are employed, but a greater or less number may of course be utilized if desired, and as all of the elements are identical in form and construction, the following description of one of them will suffice, reference in this connection being particularly had to Figs. 4 to 7 inclusive.

While the specific form and construction of the cutting elements is capable of some variation, the particular embodiment illustrated in said figures and shown as assembled in the cutter in Figs. 1 to 3 inclusive, comprises, as stated, the cylindrical shank 6 and a cylindrical head 10 of somewhat larger diameter having similar or substantially similar helicoidal front and rear faces 11 and 12 and an axial bore 13; the head thus approximates a helical thread of substantially rectangular cross section defined by the front and rear helicoidal surfaces 11 and 12, the axial bore 13 and the outer cylindrical peripheral surface 14. During the course of manufacture of the element, a generally radial slot is cut therein from the periphery 14 to the axial bore 13; one side of this slot forms a plane 16 which, by intersection with the outer peripheral surface 14, forms the side cutting edge 18, and by intersection with the helicoidal end surface 11 forms the end cutting edge 19. As the body of the helical head is of substantially uniform cross section throughout and the surface 14 thus of uniform width, the side cutting edge 18 is therefore of the same length throughout the life of the element irrespective of how much the face 16 may be ground back by successive resharpening of the element. Moreover, as the helicoidal end surface 11 is preferably slightly outwardly inclined and the plane or surface 16 angularly disposed to a radial plane passing through the side cutting edge 18, the end cutting edge 19 extends substantially normal to the axis of the element in accordance with the principles disclosed in my earlier patent to which reference has been made.

The outer or end faces 4 of the bosses 3 on the base of the cutter are of helicoidal contour approximating that of the rear faces 12 of the cutting elements and are so disposed that they will be engaged thereby and thus afford support to the elements when the latter are operatively assembled in the base. Thus, when the elements are so essembled, rotation of any element in its bore 2 effects axial translation of that element with respect to the base by reason of the coaction of the inclined contacting faces of the element and the adjacent boss.

As all of the bosses 3 are of the same type and configuration, it will be apparent that if all of the cutting elements are identical when they are initially assembled in the base and if the relative position of each element with respect thereto is the same as that of every other element, the points formed by the intersection of the cutting edges 18 and 19 of the respective elements will all lie in a plane normal to the axis of the cutter and at a predetermined distance from the base, from which it follows that when the cutter is used for surfacing, all of the cutting edges 19 will take the same depth of cut in the work with a given setting of the machine. Moreover, the length of all of the side cutting edges will be similar.

Now if, under these conditions, the cutter is resharpened by grinding back the surfaces 16 of the respective elements and the elements then reassembled in the cutter with the cutting edges of each element in exactly the same position of rotative adjustment as they initially occupied, it is apparent that each element will have been turned in a counterclockwise direction (when viewed as in Figs. 2, 4 or 6) through an arc the length of which was determined by the amount which that element was ground back, and further, that this rotation of each element will have been effective, through the axial translation of the element induced by the cooperation of its rear face 12 and the face 4 of the adjacent boss, to move the element away from the face of the cutter the exact amount required to bring the points formed by the intersection of its cutting edges 18 and 19 into the same plane as that which was tangent to the corresponding points prior to the element being ground. Or, in other words, the counterclockwise rotation of the element necessary after grinding to bring its cutting edges to the same relation with the base as they formerly occupied is operative, through the coaction of the adjacent boss and rear helicoidal face of the element, to move the head of the element away from the base exactly the right amount to position the cutting edge 19 of the element exactly the same distance from the base as the corresponding edge occupied before the element was ground. From this it results that the cutter as a whole after its several elements have been resharpened and properly reassembled in the base, will take exactly the same depth of cut in the work without any readjustment of the machine as it took prior to the grinding operation whether all of the elements have been ground back the same amount or one element for some reason or another has been ground back farther than the other elements for, in this latter case, that element will be turned a little farther in a counterclockwise direction when being reassembled in the base than the other elements so as to bring its cutting edges into the same relative position to the base as they initially occupied; consequently, this additional rotation of the element will translate it a little farther from the face of the cutter than the other elements, thereby bringing the point of intersection of its cutting edges into the same plane as the corresponding points of the other elements.

Moreover, since in cutting elements constructed in accordance with my invention, the peripheral surface 14 is of the same length at all points around the periphery of the head, the length of the side cutting edge 18 remains constant irrespective of how much the element may be ground back, while, of course, the side edges of all of the elements when properly adjusted in the cutter head are disposed at a constant distance therefrom at all times.

While any suitable gauge may be employed to assist in properly setting the several elements in the cutter head, a convenient type thereof and one which I generally prefer to employ comprises a cylindrical sleeve 20 surrounding the head and normally occupying the position shown in Fig. 1, from which, however, it may be slid along the head to substantially the position shown in Fig. 3. The front edge of this sleeve 20 is provided with teeth 21 circumferentially spaced to conform to the spacing of the cutting elements and having indexing faces 22 parallel to the axis of the cutter and adapted to be engaged by the cutting edges 18 of the several elements. When advanced to gauging position on the base the sleeve may be rigidly secured thereto by means of a set screw 23 threaded into the base through a slot 24 in the sleeve, an index line 25 on the latter and a scale 26 on the base facilitating the positioning of the sleeve in the proper position of rotative adjustment to effect the desired setting of the elements. Thus, when the several elements are to be replaced in the head, as after grinding, the sleeve 20 is moved axially into operative position as shown in Fig. 3 and into the correct position circumferentially as indicated by the graduated scale and index line, and the set screw 23 then tightened. The several elements are then inserted in their bores and brought into engagement axially with the shoulders 6 and circumferentially with the faces 22 of the teeth on the sleeve, and are then rigidly secured in these positions in the base by means heretofore described. Thus, the faces 16 of the several elements are always brought to the same position with respect to the base for any given setting of the sleeve and, as hitherto explained and as will appear by reference to Figs. 4 to 7 inclusive, their cutting edges 19 are always the same axial distance from the base of the cutter for any given position of the faces 16 regardless of the amount of metal which may have been removed from the elements by the grinding operation. By varying the setting of the sleeve when in its gauging position a wide range of variation in the "hook" and "backing off" of the elements may be obtained, the axial relation of the cutting edge 19 to the base varying somewhat in accordance with the variations in the amount of hook. The sleeve 20, of course, may be either slid back out of the way or removed from the base when the cutter is employed for cutting, as its sole function is to aid in properly and similarly adjusting the several elements in the base.

It will thus be apparent that the axial translation of each cutting element requisite to compensate for the amount which the element is ground back each time it is sharpened is effected through mutual cooperation of a generally helicoidal surface on the base and a generally similar surface on the cutting element when the latter is brought to a position in which the new cutting edges resulting from the sharpening operation are brought to the same relative position with respect to the cutter head as was occupied by the corresponding edges prior to the grinding of the element, with the result that the points on the several elements formed by the intersection of their respective cutting edges are thus re-located in the same plane and at the same distance from the head each time the elements are assembled in the head after being removed therefrom for grinding. Similarly, in the forms of cutters now to be described, the same result is obtained in substantially the same way and by substantially the same means, although the specific forms of cutting elements employed differ in certain instances appreciably from the elements to which reference has heretofore been made; in common with said elements, however, all of the elements hereinafter referred to are so formed and of such character as to require but a relatively small amount of "high speed steel" or analogous material for their initial production while affording an extremely long operative life as they can be repeatedly re-ground as and when required to keep them in proper condition until so little metal remains that it will not afford adequate support to the cutting edges, or the length of the element is so reduced as to prevent its being properly secured in the cutter head.

Thus, in the form of the invention shown in Figs. 8 and 9, the cutting element $E^1$ comprises a hollow cylindrical body portion 30 surrounded by a helical thread 31 integral therewith and of any desired form. As shown, this is of rectangular cross section, but other types of threads such as the well known "Acme" thread or even, in some instances, V or other forms of threads may be employed. The cutter base $B^1$ is provided with a plurality of annularly spaced bores 32 each having an internal thread 33 cooperative with the thread 31 of the element when the latter is seated in the bore, the inner diameter of the thread in the bore being preferably slightly greater than the external diameter of the body of the element so as to leave a slight clearance 34 between the body and the adjacent faces of the thread 33. The elements may be secured in the base in any suitable way, for example, by providing the base with a plurality of radial slots 35 extending inwardly from its periphery and alternately intersecting the bores therein, the slots between those intersecting the bores being in turn intersected by tapered holes drilled in the base parallel to its axis and near its periphery for the reception of taper pins 36 which, after the elements are assembled in the base and properly positioned therein, are driven home so as to constrict the segments of the base lying on opposite sides of each element against the latter to thereby lock it in position. This arrangement constitutes a convenient one for securely holding the elements in the base and is shown as employed for this purpose in the forms of cutter illustrated in Figs. 10 and 11 and 14 and 15 respectively, but of course any other means suitable for the purpose may be utilized if preferred. Prior to the assembly of each element in the base, its front or leading end is ground so as to provide a side cutting edge 18 and an end cutting edge 19, the plane, which by intersection with the end surface and peripheral surface of the element forms the said edges, being of course so angularly disposed with respect to the radial plane coincident with the side cutting edge, as hitherto explained, as to give the element the proper "backing off" and "hook" when assembled in its intended position in the base.

Any suitable form of gauge or other means may be utilized for setting the elements initially or after they have been re-ground, and it will thus be apparent that, as in the form of invention heretofore described, the rotative advance of each element in a counterclockwise direction necessary to bring its cutting edges after re-grinding into the same relation with the work as that which they initially occupied, is effective through the coaction of the helicoidal surfaces of the thread on the element and in the base to translate or advance the element longitudinally forward so as to re-locate the points formed by the intersection of the cutting edges of the several elements in the same or substantially the same plane as that which the corresponding points occupied before the elements were ground and irrespective of how much any particular element may have been ground back. Therefore, whatever may have been the amount of metal removed from each element, the said points of intersection, when all of the elements are re-assembled in the cutter with their cutting edges occupying the same angular relation thereto, will all lie in a plane which always bears the same relation to the face of the cutter, thus avoiding necessity for re-adjustment after each grinding of the machine in which the cutter is being used.

The form of the invention shown in Figs. 10 and 11 is substantially the same as that to which reference has just been made, save for the fact that instead of providing each of the bores in the cutter base $B^2$ with an internal thread extending throughout or substantially throughout its length, the said bores are made cylindrical and counterbored at their forward extremities to a somewhat greater diameter for the reception of what is in effect a nut 37 having one or more turns of internal thread adapted for cooperation with the thread 31 on the element $E^2$, the nut being operatively secured in the counterbore by set screws 38 or in any other convenient way. This construction is sometimes to be preferred since the nut may be readily formed of steel or other metal which is either initially extremely hard or which may be hardened during manufacture while the base of the cutter may be made of machine steel or the like, thus minimizing wear on the thread through which the element is projected as it is gradually advanced with relation to the head with consequent enhancement of the accuracy of the cutter as a whole and prolongation of its useful life. The nuts of course may be readily removed and replaced upon the occurrence of appreciable wear and, in order to permit them to be constricted about the elements when the pins 36 are driven home, each nut is split as best shown in Fig. 10, desirably in alignment with the slot 35 which intersects the bore in which the nut is disposed. The operation of this form of the invention is identical with that shown in the preceding figures, and requires no extended description.

In the form of the invention shown in Figs. 12 and 13, each of the elements E³, instead of comprising a hollow cylindrical body surrounded by a helical thread, is in the form of a helical coil of rectangular or other preferred cross section, while the bores in the base B³ intended for their reception are each provided with an internal helical thread 33 cooperative therewith. When each element is assembled in the head a hollow cylindrical sleeve 40 having an internal taper bore and of suitable outside diameter to fit fairly snugly in the element is inserted in the latter; this sleeve is provided with longitudinal annularly spaced slots 41 for the major portion of its length and is designed to receive a cone-shaped expander 42 having at its rear end a threaded stem 42' for the reception of a nut 43 which may be set up against a washer 44 interposed between the nut and the adjacent end of the sleeve so as to draw the expander into the latter and, in turn, expand the element sufficiently to lock it in the base in any desired position of adjustment. Desirably, the rear end of the bore in which the element is seated is countersunk as at 45 so as to dispose the end of the stem and nut below the rear face of the base, and since the locking of the elements in the base is desirably effected by the means just described, the radial slots 35 and taper pins 36 are omitted from the base and the latter made solid in the vicinity of the element receiving bores.

The form of the invention shown in Figs. 14 and 15 closely approximates that disclosed in Figs. 8 to 11 inclusive, save that the bodies 47 of the cutting elements are made solid instead of hollow. In these figures the elements are shown as provided with thread one side of which is at right angles to the center line and the other side of which approximates the well-known Acme form, instead of with a thread of rectangular cross section, but, as hitherto stated, the particular form of the thread employed is a matter of choice. As the body of the element is solid, a slot 48 may be desirably provided in its rear end for the reception of a screw driver or other implement by means of which the rotation of the element in the base may be conveniently effected.

In the form of the invention shown in Figs. 16 and 17, each of the elements E⁵ conforms closely to the heads of the elements E and thus consists substantially of a single turn of a helical thread of rectangular cross section surrounding a void or cavity 13. Annularly spaced bores 32 are formed in the base for the reception of the elements and an annular cam 50 having a helicoidal front face is seated in each bore and secured therein by a pin 51, or in any other convenient way, in such manner that the said face of the cam will cooperate with the rear helicoidal surface of the element to effect the requisite forward translation thereof when the element is turned in a counterclockwise direction. For retaining the element in operatively locked position in the bore, any suitable means may be employed such, for example, as a bolt 52 having a cone-shaped head 53 adapted for reception in the void or cavity 13 and a threaded shank extending rearwardly through a hole in the base coaxial with the bore 32 for the reception of a nut 54 preferably located in a counterbore 55 in the rear face of the base, whereby when the nut is set up the coned head of the bolt may be drawn into the element so as to expand the same in the bore 32 and thus lock it in position. The slot 35 and taper pin 36 may thus be omitted from the base as in the case of the cutter shown in Figs. 12 and 13.

It will thus be apparent that the principles of my invention may be embodied in cutters of numerous forms, of which those illustrated and described by way of example merely and not by way of restriction or limitation may be taken as typical, and that in each instance the element is of such character as to permit its being resharpened for a very great number of times by grinding back the face at its leading end, for but a small portion of the metal is ordinarily removed at each grinding. Thus, cutters constructed in accordance with my invention may be operated very economically in the hands of the user, for while the initial cost of the cutting elements is necessarily relatively high if they are made of the best grades of cutting steels or alloys, their form and construction is such that their effective life is very great, since all of the material in the elements other than that necessary to afford the requisite support to the cutting edges or to enable the elements to be properly secured in the base of the cutter may be progressively used up before the element becomes unserviceable.

Economy of operation is also enhanced by the fact that it is unnecessary for the proper operation of the cutter after re-grinding that all of the elements be ground back exactly the same amount since, as hitherto explained, if one element be ground back a little farther than the others, either because such grinding is requisite to properly sharpen it or because of carelessness of the workman, that element nevertheless when properly assembled in the base will have its cutting edges disposed in exactly the same relation thereto as all of the other elements, with the result that after each re-grind of the cutter the cutting edges of the several elements are all so disposed as to operate equally on the work, and the points formed by the intersection of the side and end cutting edges of the several elements will all lie in the same plane and thus at the same distance from the base as the corresponding points of the elements prior to their being ground, thus obviating the necessity for readjusting the machine after each grinding of the cutter to effect the same depth of cut in the work as was being taken prior thereto.

While I have herein described certain embodiments of my invention with considerable particularity, I do not thereby desire or intend to restrict myself specifically thereto, as changes and modifications may be made in the design, construction and arrangement of the various parts and in the precise form of the cutting elements employed to adapt the cutter for use under varied operating conditions or for other purposes as may be desired, without departing from the spirit and scope of the invention as defined in the appended claims.

Having thus described my invention, I claim and desire to protect by Letters Patent of the United States:

1. A milling cutter comprising a base having a plurality of annularly spaced bosses projecting from its front face and a plurality of cutting elements respectively removably supported in the head adjacent said bosses, each of said elements having a substantially helicoidal surface engaging the adjacent boss and cooperative therewith to effect axial translation of the element relative to the base when the element is rotated a substantially congruent helicoidal surface axially spaced therefrom and a peripheral surface defined by the intersections of said helicoidal surfaces with the surface of a cylinder coaxial with the element.

2. A milling cutter comprising a base having a plurality of bosses extending from its front face in annularly spaced relation and a bore adjacent each boss, and a plurality of cutting elements each having a shank extending into one of said bores and a head of greater diameter than the shank, the front and rear surfaces of the head being of substantially helicoidal contour, said rear sruface seating on and cooperating with the adjacent boss to effect longitudinal translation of the element in the base when the element is rotated.

3. A milling cutter comprising a base having a plurality of bosses extending from its front face in annularly spaced relation and each having a front face of substantially helicoidal contour and a bore adjacent each boss, and a plurality of cutting elements each having a shank extending into one of said bores and a cylindrical head of greater diameter than the shank, the front and rear surfaces of the head being of substantially helicoidal contour and extending parallel to each other, said rear surface seating on and cooperating with the helicoidal face of the adjacent boss to effect longitudinal translation of the element in the base when the element is rotated.

4. A cutting element adapted for operative assembly in a cutter base and comprising a shank and a head of greater diameter than the shank having substantially helicoidal front and rear faces defined by surfaces generated by helical revolution of a pair of parallel tangents to a cylinder coaxial with the shank, a cylindrical surface joining said faces and extending parallel to the longitudinal axis of the shank, and a plane surface also extending parallel to said axis and intersecting said cylindrical surface and said front face to form two cutting edges respectively extending substantially parallel to and normal to said axis, said rear face being adapted for cooperative engagement with a supporting element carried by the cutter base when the element is assembled therewith.

5. A cutting element comprising a head of substantially uniform axial width having an interrupted cylindrical peripheral surface, front and rear substantially parallel helicoidal faces and a transverse substantially plane surface intersecting the front helicoidal face in a line substantially normal to the longitudinal axis of the element and intersecting said peripheral surface in a line substantially parallel to said axis to respectively form end and side cutting edges and lying in angular relation to the radial plane through said side cutting edge, said rear helicoidal face being adapted for cooperative engagement with a supporting element carried by a cutter base when the element is operatively assembled therewith.

PETER P-G. HALL.